No. 760,429. PATENTED MAY 24, 1904.
P. DANCKWARDT.
FILTER.
APPLICATION FILED MAR. 4, 1904.
NO MODEL. 2 SHEETS—SHEET 1.

Witnesses:
Arthur Junger
Frederick Unfricht

Inventor:
Paul Danckwardt
by Hauff & Biesen Atty.

No. 760,429. PATENTED MAY 24, 1904.
P. DANCKWARDT.
FILTER.
APPLICATION FILED MAR. 4, 1904.
NO MODEL. 2 SHEETS—SHEET 2.
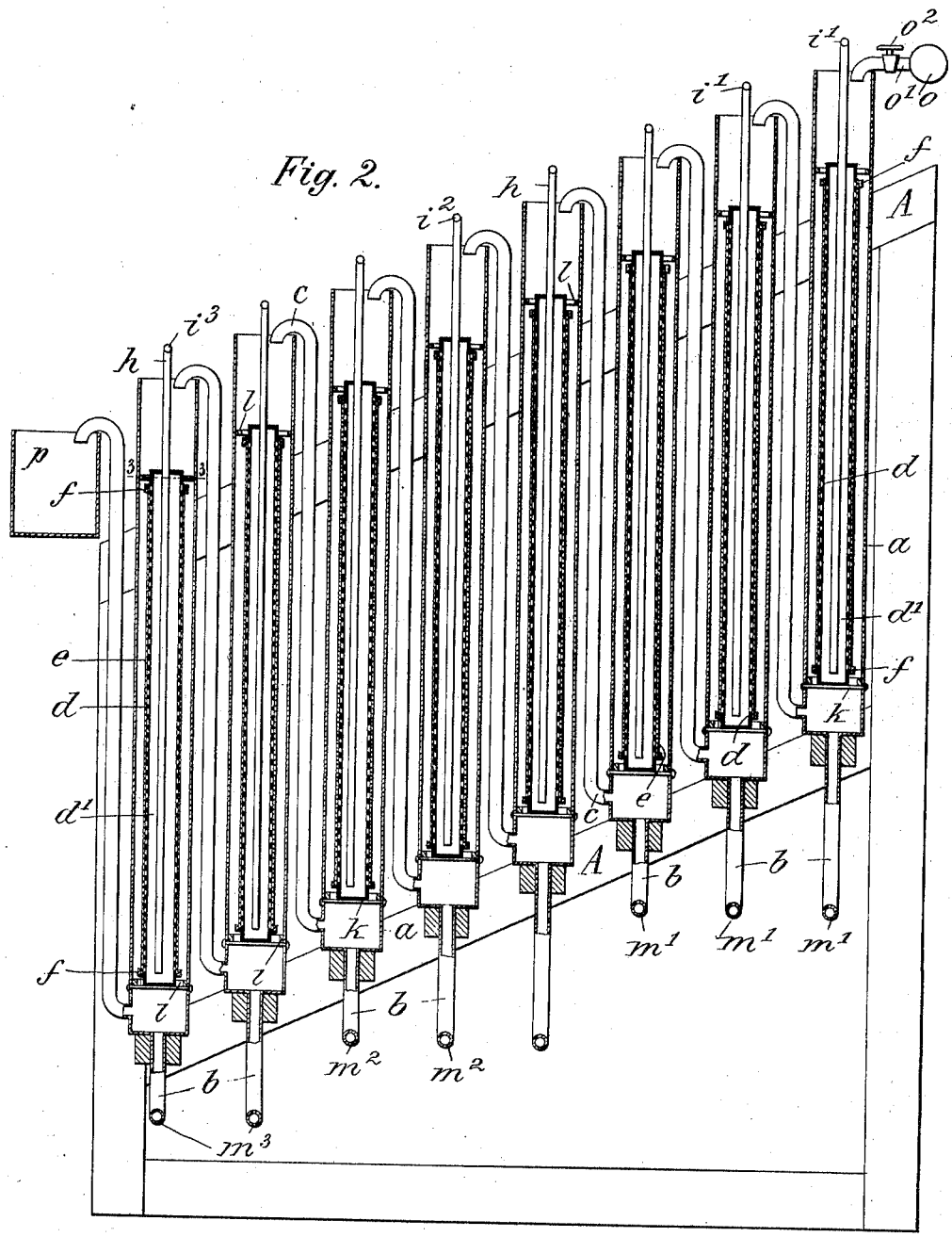

No. 760,429.

Patented May 24, 1904.

UNITED STATES PATENT OFFICE.

PAUL DANCKWARDT, OF DEADWOOD, SOUTH DAKOTA.

FILTER.

SPECIFICATION forming part of Letters Patent No. 760,429, dated May 24, 1904.

Application filed March 4, 1904. Serial No. 196,535. (No model.)

*To all whom it may concern:*

Be it known that I, PAUL DANCKWARDT, a citizen of the United States, residing at Deadwood, Lawrence county, State of South Dakota, have invented new and useful Improvements in Filters, of which the following is a specification.

This invention relates to a filter for extracting valuable metals—such as gold, silver, copper, zinc, nickel, &c.—from low-grade ores or slimes that cannot be leached in an ordinary tank with a heavy layer of ore or which require such fine grinding that leaching from a tank becomes an impossibility and for which the present processes in use—viz., those by decantation or filter-presses or suspended filters— are too expensive.

Figure 1:
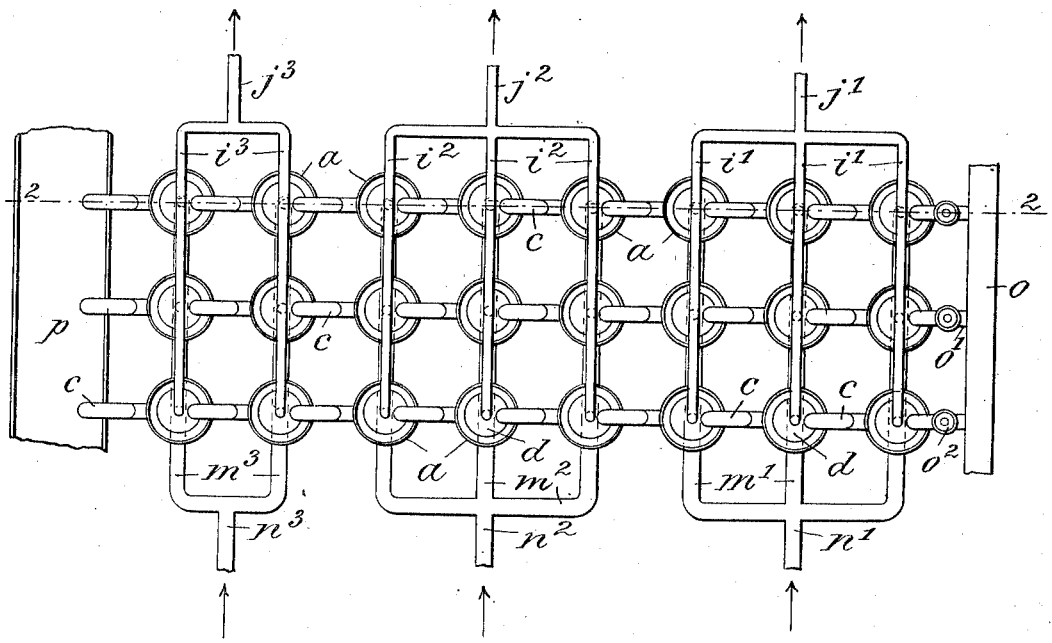
Figure 3:
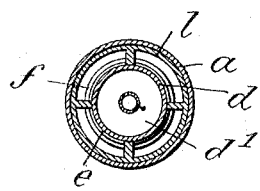

In the accompanying drawings, Figure 1 is a plan of my improved filter; Fig. 2, a vertical longitudinal section on line 2 2, Fig. 1; and Fig. 3, a detail cross-section on line 3 3, Fig. 2.

The apparatus consists of a series of tubular shells or vessels $a$, arranged in batteries and on successively lower levels in a suitable frame A. The shells $a$ communicate at their bottom with pipes $b$ for the introduction of the solvent or water. At a distance above its bottom each shell $a$ is provided with a bent discharge-pipe $c$, which carries the pulp and solution from the bottom of one shell to the open top of the adjoining shell. Within each shell $a$ is contained a cylindrical filter $d$, closed at both ends to form a filtering-chamber $d'$, its perforated side being covered by one or more layers of suitable filtering material $e$— such as burlap, cocoa matting, canvas, or flannel—which are held in place by clamps or rings $f$. A suction-pipe $h$ extends through the top of each filter $d$ and terminates at a short distance above its bottom. These suction-pipes connect with a suction-pump (not shown) by a system of pipes $i'$ $i^2$ $i^3$. The pipes $i'$ connect the pipes $h$ of the first battery of shells $a$, the pipes $i^2$ connect the pipes $h$ of the second battery of the shells, &c. This is to be seen in Fig. 1, where the shells $a$ are shown to be arranged in three parallel rows. The first, second, and third vessels of each row deliver the gold solution to the same tank through the collecting-pipe $j'$. The fourth, fifth, and sixth vessels $a$ of each row deliver a weaker solution through pipe $j^2$ to a second tank, while the seventh and eighth vessels of each row deliver the weakest solution to a third tank by pipe $j^3$.

Each filter $d$ rests upon a bolt $k$, passing through shell $a$, and is centered at the top and bottom by a skeleton ring $l$. The pipes $b$ of each battery receive their solvent from a separate pipe $m'$ $m^2$ $m^3$, which convey, respectively, the strongest solvent to the first battery, a weaker solvent to the second battery, and the weakest solvent to the last battery. The pipes $m'$ $m^2$ $m^3$ receive their solvent through feed-pipes $n'$ $n^2$ $n^3$, respectively. The ore or slime is delivered from the mixing-tank (not shown) to the uppermost shells $a$ by feed-pipe $o$ and branch pipes $o'$, having cocks $o^2$. The lowermost shells $a$ discharge the spent pulp into launders $p$.

The total number of vessels for each row is determined by the grade and general character of the ore or slimes, the richer ore requiring the larger number of vessels. The number of rows of vessels is determined by the capacity of the mill. There may also be used more than eight filters in a row and three kinds of solution, particularly where the ore is high grade, so as to recover the greatest amount of value.

In operation the valves $o^2$ are opened and the suction-pump (not shown) connected to pipes $h$ is started. The solvent is then admitted intermittently through pipes $b$ in such quantity as to supply enough solvent or wash-water to the different vessels as to replace the amount of solvent withdrawn by suction. This is the case if the quantity of material flowing in at the topmost shell is equal to the quantity discharged from the lowermost shell per unit of time. The object of admitting this solvent intermittently and at the bottom of the vessels is to mix the ore or slimes after they have descended along the filter and have become thicker with the replacing solution and to prevent them from settling at the bottom of the vessels. The intermittent jarring motion and the consequent up-and-down motion of the whole column of solution and ore in the vessel around the filter serves also the purpose of preventing the slimes or ore from packing against the filtering-surface. Thus the filter is kept clean and in constant uniform action. The solution, which is withdrawn from the filter, is run through pipes $h\ i''\ j''\ h\ i^2\ j^2$, &c., to a precipitating-tank.

What I claim is—

1. A filter composed of a series of shells, inclosed filtering-chambers, pipes for connecting the bottom of one shell with the top of another shell, solvent-pipes entering the bottom of the shells, and suction-pipes entering the filtering-chambers, substantially as specified.

2. A filter composed of a series of shells arranged on successively-lower levels, inclosed filtering-chambers, a pipe for connecting the bottom of one shell with the top of a lower shell, solvent-pipes entering the bottom of the shells, and suction-pipes entering the filtering-chambers, substantially as specified.

3. A filter composed of batteries of shells arranged in steps, pipes for connecting the bottom of one shell with the top of a lower shell, means for admitting a separate solvent to the bottom of the cells of each battery, suction-pipes entering the filtering-chambers, and separate means for discharging the filtrate from the suction-pipes of each battery, substantially as specified.

Signed by me at Deadwood, Lawrence county, South Dakota, this 19th day of February, 1904.

PAUL DANCKWARDT.

Witnesses:
K. A. TRIMBLE,
M. M. WHEELER.